United States Patent
Windisch et al.

(10) Patent No.: US 8,746,043 B2
(45) Date of Patent: Jun. 10, 2014

(54) METHOD FOR PERMANENTLY MONITORING PRESSURIZED PIPELINES AND LINE SYSTEMS WHICH CARRY FLUID MEDIA

(76) Inventors: Stefan Windisch, Oberolm (DE); Alexander Heinl, Mainz (DE)

(*) Notice: Subject to any disclaimer, the term of this patent is extended or adjusted under 35 U.S.C. 154(b) by 800 days.

(21) Appl. No.: 12/087,933

(22) PCT Filed: Jan. 23, 2006

(86) PCT No.: PCT/EP2006/000561
§ 371 (c)(1),
(2), (4) Date: Jan. 15, 2009

(87) PCT Pub. No.: WO2007/087819
PCT Pub. Date: Aug. 9, 2007

(65) Prior Publication Data
US 2009/0223285 A1 Sep. 10, 2009

(51) Int. Cl.
*G01M 3/04* (2006.01)

(52) U.S. Cl.
USPC ............................................. 73/49.5; 73/37

(58) Field of Classification Search
USPC .................. 73/49.5, 37; 137/317–325; 138/89
See application file for complete search history.

(56) References Cited

U.S. PATENT DOCUMENTS

| | | | | |
|---|---|---|---|---|
| 4,216,793 | A | * | 8/1980 | Volgstadt et al. ............. 137/318 |
| 4,402,340 | A | * | 9/1983 | Lockwood, Jr. ............ 137/493.7 |
| 4,508,130 | A | * | 4/1985 | Studer et al. ............... 137/15.11 |
| 4,921,004 | A | * | 5/1990 | Lane et al. ................... 137/318 |

FOREIGN PATENT DOCUMENTS

| | | | |
|---|---|---|---|
| DE | 102004016378 | 11/2005 | ............... F17D 5/00 |
| WO | WO2005/095916 | 10/2005 | ............. G01M 3/28 |

OTHER PUBLICATIONS

Notification of Transmittal of Translation of the International Preliminary Report on Patentability, English translation of the International Preliminary Report on Patentability and English translation of the Written Opinion of the International Searching Authority.

* cited by examiner

*Primary Examiner* — Hezron E Williams
*Assistant Examiner* — Rodney T Frank
(74) *Attorney, Agent, or Firm* — Gerald T. Bodner

(57) ABSTRACT

A method for permanently monitoring pressurized pipelines and line systems, including connected loads, which carry fluid media, includes carrying out pressure measurements in different modes downstream of the transfer point between the supply device and the load connection in order to determine consumption values over predeterminable periods of time and to infer the system state. An electronically controllable shut-off valve is arranged downstream of the transfer point and a pressure sensor is arranged downstream of the valve in the direction of flow. All of the removal locations are closed and pressure is built up in the system. The shut-off valve is closed and an outlet pressure drop, which may be present, is determined over a first period of time and the initial and final pressure values are stored. The valve is opened and the consumption of water with the longest equal flow rate is set and stored as the end of commissioning. A transition is made to the drawing-off mode by opening the valve over a second period of time.

20 Claims, 7 Drawing Sheets

METHOD FOR PERMANENTLY MONITORING PRESSURIZED PIPELINES AND LINE SYSTEMS WHICH CARRY FLUID MEDIA

BACKGROUND OF THE INVENTION

1. Field of the Invention

The invention relates to a method for permanently monitoring pressurized piping and line systems, including connected loads, carrying fluid media, with pressure measurements in different modes being carried out downstream of the transfer point between supply device and load connection in order to establish consumption values over predeterminable periods of time and to infer the system state, according to preamble of patent claim 1.

2. Description of the Prior Art

DE 10 2004 016 378 A1 discloses a method and an arrangement for actively monitoring piping. The piping to be monitored carries pressurized fluid media, and loads are connected to the respective piping or piping system.

According to the teaching already known, a continuous check or checks in predetermined cycles is or are carried out with the aid of a differential pressure measurement assuming two sensors, preferably at the transfer point or downstream of the transfer point between supply device and load connection, to determine whether permanent and almost constant consumption is present over a predeterminable period of time, with an abnormal state, for example a leak, being inferred in this case, and an alarm being triggered and/or the downstream piping system being shut-off.

In the arrangement there, a series connection comprising a first pressure sensor, a valve that can be actuated electrically or hydraulically, and a second pressure sensor is provided at the transfer point or downstream of the transfer point between supply device and load connection, with control electronics being connected to the pressure sensors and the valve actuating device in order to provide an error signal in the case of a recognized pressure drop per unit time after a controlled valve shut-off.

Specifically, according to DE 10 2004 016 378 A1, a valve provided at the transfer point or downstream of the transfer point is closed during the leak determination operation so that the piping system located downstream is briefly shut off. In this state, the instantaneously present inlet pressure is established and saved. After this, the pressure drop is determined on the basis of the saved inlet pressure value and the measured outlet pressure, and a check as to whether the determined pressure drop per unit time exceeds a predetermined value is carried out, as a result of which a fault in the piping system can be inferred.

In the tapping operation, the said valve is opened and an acquisition of changes in the pressure differences of the pressure values upstream and downstream of the valve is carried out. In the case of pressure difference values no longer changing over a predetermined period of time, a switch between the mentioned operation modes is carried out. The switch between leak determination operation and tapping operation is permanently undertaken, with the switch being triggered depending on established pressure variations caused by consumer tap points. Generally, the switch between the individual modes is carried out a number of times within an hour.

In the case of operation with loads which intend to continuously remove media for a long time, e.g. for watering the garden, a volume-flow-varying element is used, with this element periodically or stochastically changing the load-dependent through-flow rate.

In the case of the method explained above, the stopping action of the valve and also the evaluation of the pressure conditions of the inlet pressure are disadvantageous for the performance aimed for. In this respect, the method and the associated arrangement must be optimized for each piping structure and for specific valves, that is to say for each demand. Furthermore, stringent requirements are imposed on the impulse behavior of the pressure sensors used.

With regard to known pressure difference measurements with downstream processor-aided pressure evaluation, reference is also made to DE 197 06 564 A1, wherein a shutting-off command is triggered in that case when a predetermined water outflow is exceeded, and there is thus no specific leak determination operation.

DE 198 14 903 C2 discloses a method for preventative shutting-off of a supply line for a medium depending on the consumption habits of the users and pressure measurements in the lines. Specifically, the line pressure in the shut-off pipeline is measured in that case in a shut-down phase and, in the case of a pressure drop in the piping system that is unusual for normal consumption, a fault is signaled. In a refinement, not only the pressure drop, but also a pressure increase over the usual level is intended to be evaluated.

In the case of this solution from the prior art, it is thus necessary to establish pressure conditions which apply to the usual use and consumption, with all such pressure conditions having to be saved as comparison values.

OBJECTS AND SUMMARY OF THE INVENTION

It is thus an object of the invention to specify a method developed from the abovementioned for monitoring pressurized piping and line systems, including connected loads, carrying fluid media, with the method intended to be effective in a virtually self-calibrating manner and being able to ensure the desired significant statements about the conditions in the piping system with a minimal number of pressure sensors. The method is intended to be able to be used both in cold water lines and hot water lines having circulation and also to permit the detection of so-called microleaks.

The object of the invention is achieved by a method according to the definition in patent claim 1, with the dependent claims at least representing expedient refinements and developments.

The fact that a repeatedly recurring pressure drop within the piping system to be monitored after the supply has been cut off by closing a valve constitutes a fault is used as the approach to solve the object according to the invention.

According to the invention, the arrangement of an electronically controllable shut-off valve, for example a solenoid valve, downstream of the transfer point in connection with a single pressure sensor downstream of the valve in the flow direction is the only requirement. The method itself is implemented by control electronics, with the fault evaluation and fault processing being carried out fully automatically, that is to say aided by a program.

A piezoelectric pressure sensor with current output can be used as a pressure sensor, with the shut-off valve preferably being designed as a solenoid valve with a manual override.

If an additional hot water circuit is provided in the line network, it is likewise equipped with the valve-sensor unit.

After arranging the electronically controllable shut-off valve downstream of the transfer point and also arranging the pressure sensor downstream of the shut-off valve in the direction of flow, all removal points are firstly closed with a resulting build-up of pressure in the system for a start-up procedure evoked by the method. The shut-off valve is then closed, and the outlet pressure drop present, if applicable, is determined over a first period of time, to be precise.

Initial and final pressure values associated with the determination of the first outlet pressure drop are written to a memory.

After this, the opening of the valve and setting, and also saving, of the value of water consumption with the longest unchanging flow rate are carried out to complete the start-up procedure. This water consumption value with the longest unchanging flow rate can, for example, correspond to the filling of a bathtub with water.

After the start-up procedure, a transition into the tapping mode is undertaken by opening the shut-off valve for a second period of time.

After completing the tapping mode, there is a switch to the leak search mode, to be precise after the second period of time has elapsed, that is to say the period of time corresponding to the tapping mode, by briefly shutting off the shut-off valve, determining the outlet pressure and saving this value, calculating a second pressure drop during the procedure to close the valve and comparing it the second pressure drop to a predetermined fixed value.

After this, checking the value of the second pressure drop in the preceding comparison step and determining whether a large leak or high instantaneous consumption condition has occurred, as well as writing the result to an error buffer are implemented.

This pressure drop measurement is repeated within a relatively short period of time and a comparison of the value of the pressure drop obtained at this point in time to the value in the error buffer is carried out, and the error buffer is erased if no change can be determined.

After this step, a transition into the first stage of an extended leak search mode with the shut-off valve still being closed is undertaken by comparing the pressure drop in this step with a predetermined fixed value for determining a smaller leak that could be present. This error value is likewise written to a memory, and a repetition of the pressure drop measurement is carried out within a short period of time and a comparison of the value of the pressure drop obtained at this point in time to the error value is carried out, and the error value in the memory is deleted if no excess of the pressure drop value can be determined, or an alarm is emitted if it is determined that the value is exceeded, with a subsequent transition into the tapping mode.

After deleting the error value, a second stage of the extended leak search mode is initiated, with the shut-off valve still being closed. In this case, the instantaneous outlet pressure is established, the outlet pressure value is saved, establishing a current pressure value and determining a third pressure drop present, if applicable, over a third period of time which is longer than the first or second period of time are carried out, and a comparison with the established outlet pressure drop is carried out, in order to infer a small leak if it is exceeded.

The error value is then saved and reported, and a transition into the tapping mode is carried out, or, in the case of not exceeding the pressure drop, a transition into the rest mode with the valve closed is carried out, with the rest mode ending when a running pressure measurement reveals a pressure drop or a period of time has elapsed which is greater than the third period of time, with a transition into the tapping mode following in turn.

According to the invention, there is permanent switching between tapping and leak modes, and rest mode.

In a refinement, in the case of multiple terminations of the leak search with an error message, the summed up error value is compared to a preset value and, in the case of it exceeding the preset value, a significant system fault with a large leak is inferred.

In the case of multiple terminations of the extended leak search with an error message, the summed up error value is compared to a second preset value and, in the case of it exceeding this preset value, a smaller leak in the system is recognized.

According to appropriate specifications, in the case of a fault the valve is permanently closed.

In the case of arranging the valve-sensor unit upstream of a filter unit or pressure control unit in the flow direction, it is possible for the valve-sensor unit to detect mains-side pressure excesses and, if applicable, the connected piping system can be protected against these pressures by closing the valve.

Additional temperature sensors and their measured values permit the recognition of pressure variations on account of temperature changes in the medium, and the elimination of these during the search for the fault.

The invention is intended to be explained in more detail below on the basis of an exemplary embodiment with reference to the flowcharts.

DETAILED DESCRIPTION OF THE PREFERRED EMBODIMENTS

Figure 1:
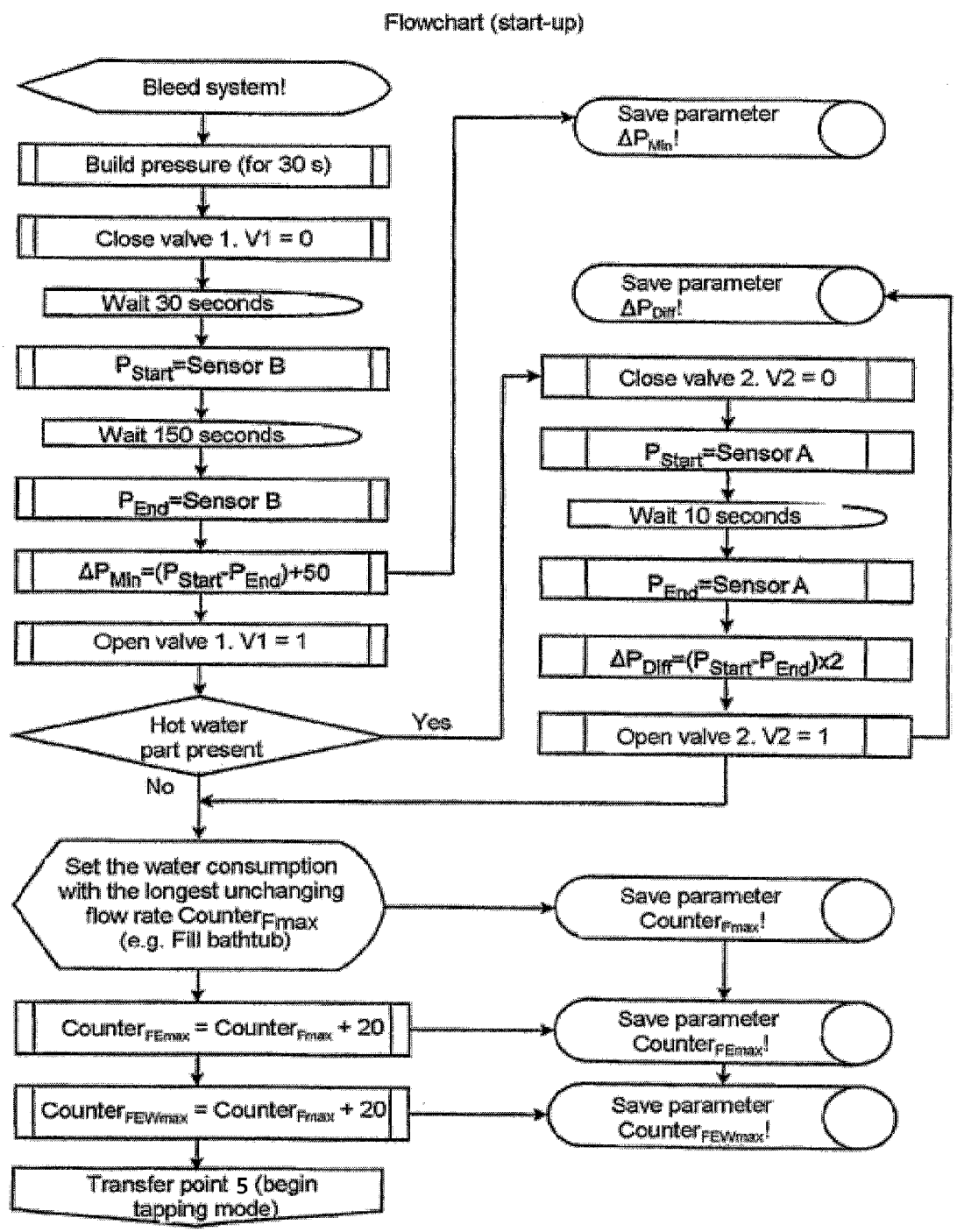
FIG. 1 shows a flowchart concerning a start-up mode.

The flowcharts in FIG. 1-FIG. 7 show the different modes of operation of the method according to the invention, with sensor B being understood to mean the sensor in the cold water line, and sensor A meaning the sensor in the hot water line.

The start-up (FIG. 1) is carried out after switching-on the hardware-implemented measuring apparatus by means of the user firstly being prompted to bleed the system (Bleed system!). Then pressure is built in the system (build pressure (for 30 s)) all water removal points are to be closed (Close valve 1. V1=0). After waiting for 30 seconds, it is then possible to check the tightness of the respective piping system. This start-up step can be skipped if the system does not have any leaks.

To check for tightness, the preferably used solenoid valve is closed (V1=0) and the minimal pressure drop over a fixed period of time, for example 150 seconds, is established ($\Delta P_{Min}=(P_{Start}-P_{End})+50$). The parameter $\Delta P_{Min}$ is saved. A minimal pressure drop can be caused, for example, by dripping faucets or toilet tanks.

Likewise, the tightness of the hot water system is checked at the operating point, but of course only if such a hot water system is present and the sensor system is installed in it (Hot water part present—Yes).

To check the hot water system, the solenoid valve in the hot water part is closed (Close valve 2 V2=0) and the pressure drop is established over a fixed period of time (e.g. 10 seconds). By way of example, a pressure drop here ($\Delta P_{Diff}=(P_{Start}-P_{End})\times 2$) can be traced to a cooling of the water due to interrupted circulation.

Finally, the prompt to set the water consumption with the longest flow rate is carried out, for example to fill a bathtub (Set the water consumption with the longest unchanging flow rate $Counter_{Fmax}$).

The counter $F_{max}$ is stored.

The $counter_{FEmax}$ corresponds to cold water of the cold water part of the piping installation and is stored.

The $counter_{FEWmax}$ corresponds to warm water of the warm water part of the piping installation and is stored. $Counter_{FEmax}$ and $counter_{FEWmax}$ results from addition $counter_{Fmax}$ with 20.

After saving the parameters the tapping mode (transfer point 5—FIG. 2) is initiated.

The following description of the function relates to the cold water part (Sensor B) of the piping installation to be monitored, unless specifically mentioned otherwise.

The operation evoked by the method relating to the hot water part (Sensor A) of the installation is only explained separately in the extended leak search mode, part 2, and in the error evaluation part. In all other modes, the hot water valve is opened and the pressure sensor only serves for determining the instantaneous pressure.

In the tapping mode (FIG. 2), the valve is opened (V1=1) for a specified period of time, for example for 60 seconds. For counting the specified period of time it is necessary, to initialize the counter ($Counter_Z=0$) in a first step ($Counter_Z$=Counter tapping mode). In the exemplary embodiment "increment counter reading $Counter_Z=Counter_Z+1$" is carried out until Counter reading$_Z>60$. This means the valve is opened for 60 seconds. Afterward the system switches into the leak search mode (transfer point 1—FIG. 3).

The leak search (FIG. 3) mode is initiated by shutting-off the water supply by means of the solenoid valve (Close valve. V1=0) and the instantaneous outlet pressure ($P_{Start}$=Sensor B) is saved (Save sensor value $P_{Start}$!). For counting a specified period of time it is necessary, to initialize the counter ($Counter_L=0$) in a first step ($Counter_L$=Counter leak search mode).

During the closing of the valve (e.g. for 10 ms), the pressure drop ($\Delta P=P_{Start}-P_{End}$), calculated by the saved outlet pressure ($P_{start}$) and the currently measured outlet pressure ($P_{End}$), is compared to a fixed value, for example 150 mbar ($\Delta P>150$ mbar).

Should this pressure drop be exceeded ($\Delta P>150$ mbar—Yes), there is either a large leak in the system (Alarm! Permanent consumption present), or a load requires water from a tapping point at this moment in time.

Concerning the counter, the $Counter_F$ has to be incremented. $Counter_F=Counter_F+1$ and $Counter_{FE}=Counter_{FE}+1$, respectively.

If $Counter_F>Counter_{Fmax}$ ($Counter_{Fmax}$ was saved in the start-up mode in FIG. 1) an alarm is set off: Alarm! Permanent consumption present. If $Counter_{FE}>Counter_{FEmax}$ ($Counter_{FEmax}$ was saved in the start-up mode in FIG. 1) an alarm is set off: Alarm! Microleak present in the system.

Figure 2:
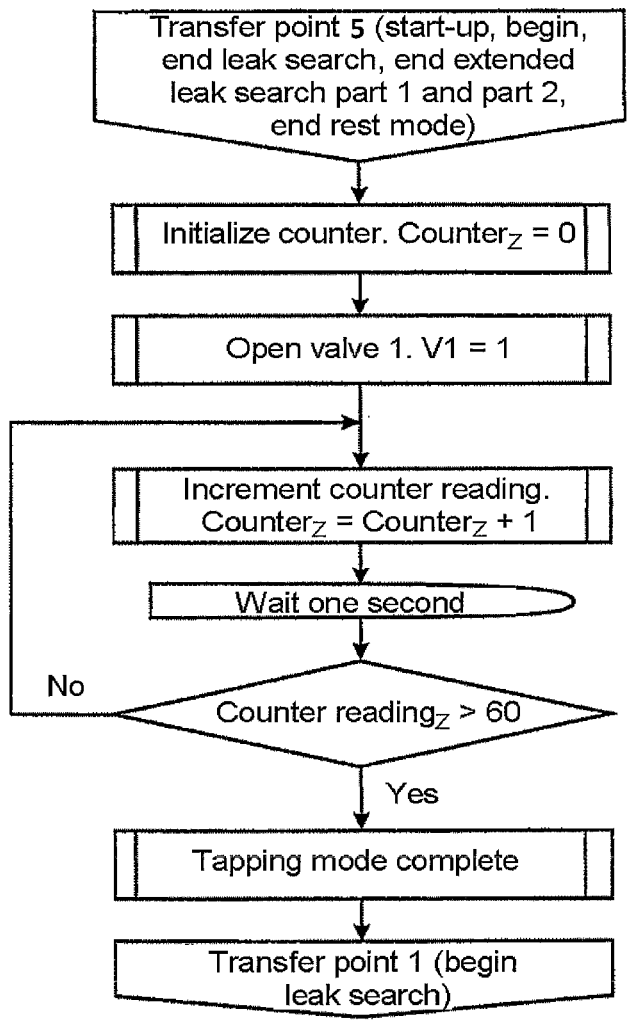
FIG. 2 shows a flowchart concerning a tapping mode.
Figure 3:
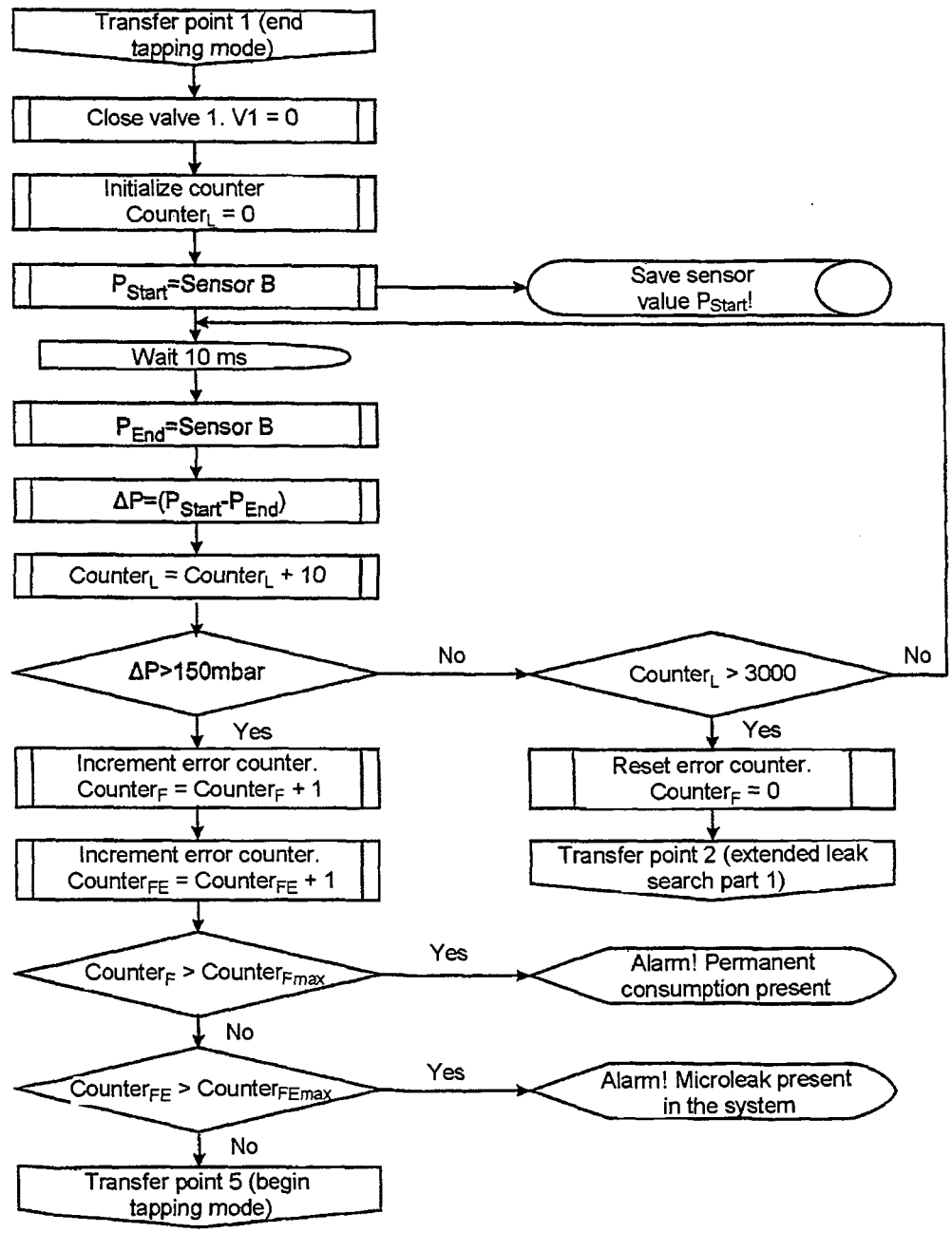
FIG. 3 shows a flowchart concerning a leak search mode.
Figure 4:
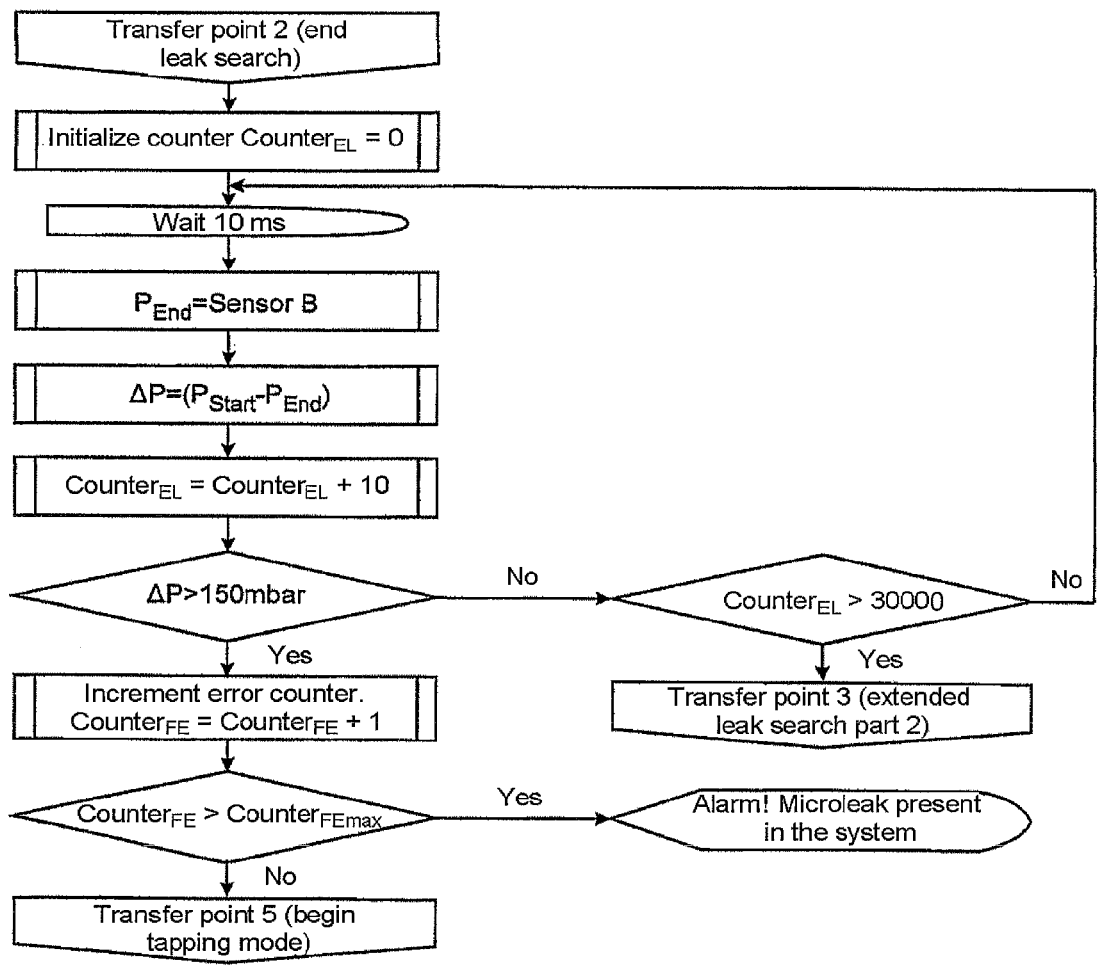
FIG. 4 shows a flowchart concerning part 1 of an extended leak search mode.

The obtained result is written to an error memory as a possible major fault of the monitored system, and the system transitions back to the tapping mode (Transfer Point 5 FIG. 2).

However, should the pressure drop not be exceeded within a set, short period of time, for example 3 seconds ($Counter_L>3000$ ms), then a correct state is determined, the error memory is erased (Reset error counter. $Counter_F=0$), and the system transitions into the extended leak search operation, part 1 (Transfer point 2 FIG. 4).

In the case of the extended leak search operation or leak search mode, part 1 (transfer point 2 in FIG. 4), the valve continues to remain closed and the pressure drop ($\Delta P=P_{start}-P_{End}$), calculated by the saved outlet pressure ($P_{Start}$) and the currently, after 10 ms (Wait 10 ms) measured outlet pressure ($P_{End}$), is compared to a fixed value, for example 150 mbar ($\Delta P>150$ mbar). For counting a specified period of time it is necessary, to initialize the counter ($Counter_{EL}=0$) in a first step ($Counter_{EL}$=Counter extended leak search mode).

Should this pressure drop be exceeded ($\Delta P>150$ mbar—Yes), there is either a small leak in the system (Alarm! Microleak present in the system), or a load requires water from a tapping point.

Concerning the error counter, the $Counter_{FE}$ ($Counter_{FE}$=cold water consumption) has to be incremented. $Counter_{FE}=Counter_{FE}+1$. If $Counter_{FE}>Counter_{FEmax}$ ($Counter_{FEmax}$ was saved in the start-up mode in FIG. 1) an alarm is set off: Alarm! Microleak present in the system.

The obtained result is written to the error memory as a possible small fault of the monitored system, and a transition to the tapping mode (transfer point 5 FIG. 2) is carried out.

Figure 5:
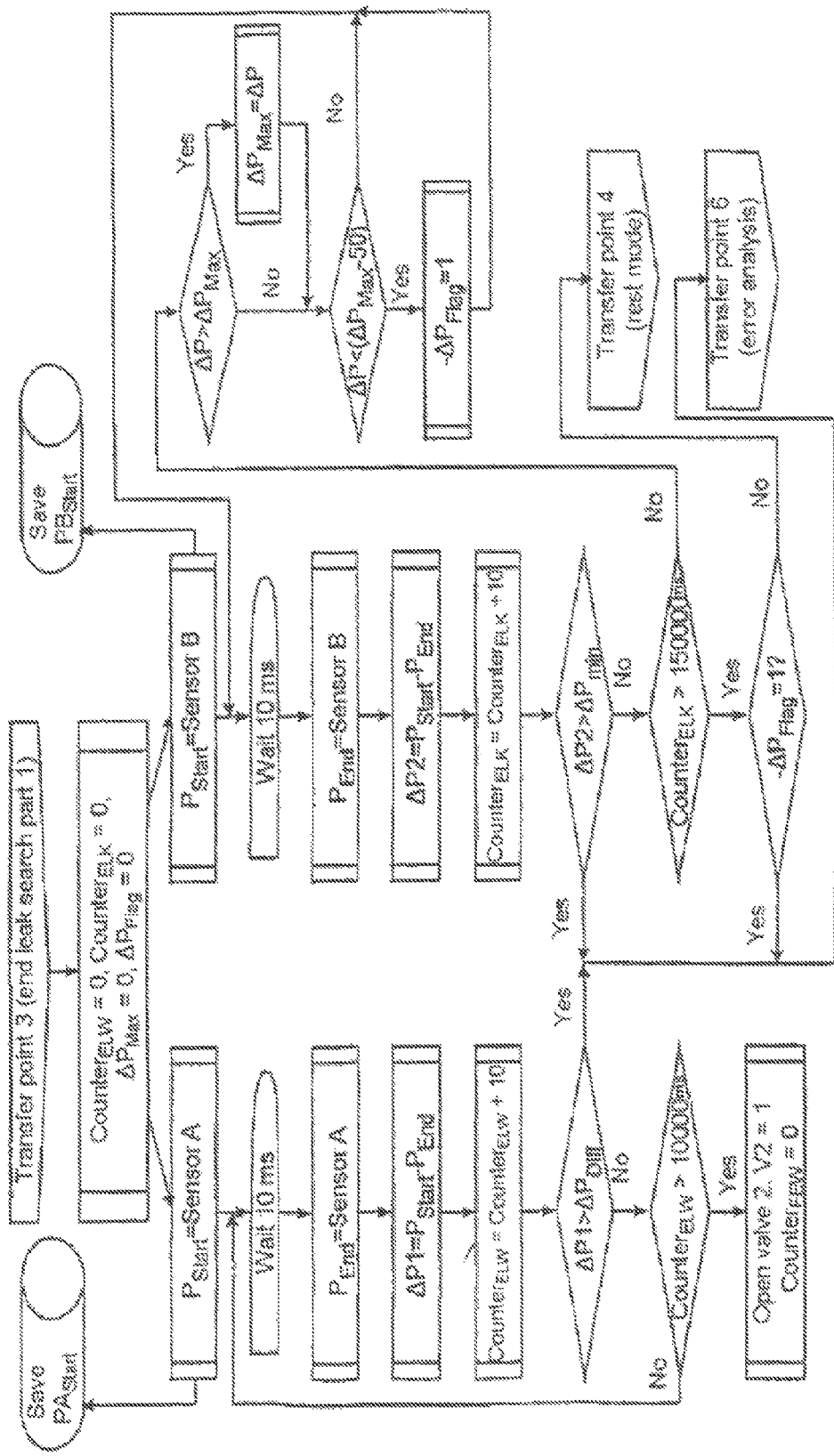
FIG. 5 shows a flowchart concerning part 2 of an extended leak search mode.

Should the pressure drop not be exceeded within a set period of time, for example 30 seconds ($Counter_{EL}>30,000$ ms), then a correct state is determined, the error memory state is erased, and the system transitions into the extended leak search operation, part 2 (transfer point 3—FIG. 5).

The abovementioned mode is used to eliminate the adjusting or closing properties of the valve and possible fluid turbulence for following measurement steps and their evaluation.

In the case of the extended leak search mode, part 2 (FIG. 5), the valve continues to remain closed, $Counter_{ELW}$, $Counter_{ELK}$ is set 0 and the instantaneous outlet pressure is saved (Save $PB_{Start}$).

In addition, the hot water valve, if present, is closed and the instantaneous outlet pressure is likewise saved (Save $PA_{Start}$).

The pressure drop ($\Delta P2=P_{Start}-P_{End}$), calculated from the outlet pressure that has just been saved ($P_{Start}$) and the currently, after 10 ms (Wait 10 ms) measured outlet pressure ($P_{End}$), is compared to the minimal pressure drop per unit time ($\Delta P_{min}$) (which is set during the start-up (FIG. 1), to be precise after the tightness measurement for the cold water part and hot water part).

Figure 7:
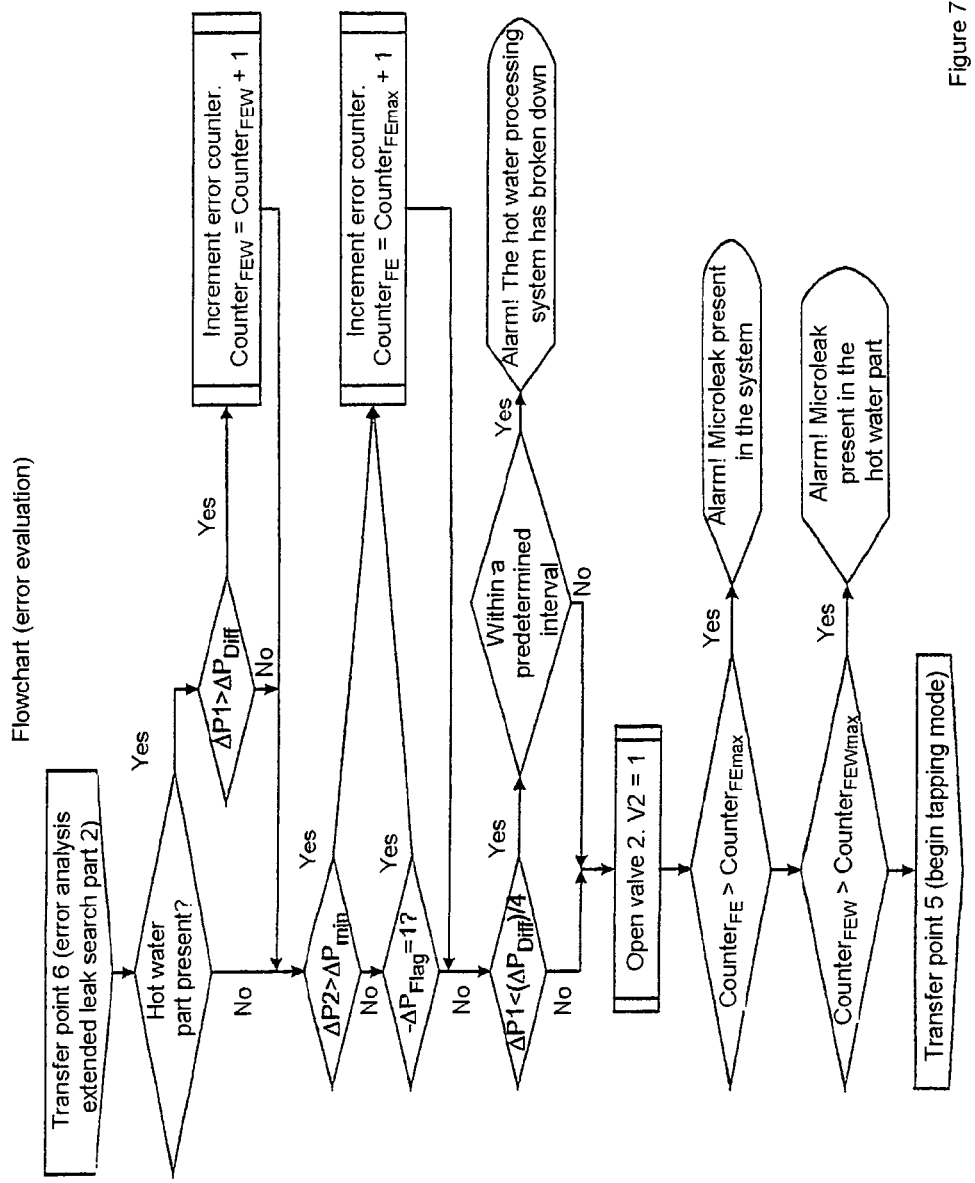

Should this pressure drop be exceeded, in either the cold water part ($\Delta P2>\Delta P_{min}$) or the hot water part to be precise ($\Delta P1>\Delta P_{Diff}$), then there is either a small leak in the system, or a load requires water and the system transitions into error analysis (transfer point 6—FIG. 7).

If the pressure drop in the cold water part is negative, that is to say if pressure is building up, for example −50 mbar ($\Delta P<(\Delta P_{Max}-50)$), then the measurement is not successfully completed ($-\Delta P_{Flag}=1$) and it is repeated.

The recognized results are written as a possible small error of the monitored system into the error memory (FIG. 7), separately for cold water and hot water to be precise, and the system transitions back into the tapping mode (transfer point 5).

For counting a specified period of time it is necessary (in FIG. 5), to initialize the counter ($Counter_{ELW}=0$) in a first step ($Counter_{ELW}$=Counter extended leak search mode, part 2 for warm water). Furthermore it is necessary, to initialize the counter ($Counter_{ELK}=0$) in a first step ($Counter_{ELK}$=Counter extended leak search mode, part 2 for cold water).

If the pressure drop for the hot water part at the operating point is not exceeded within a set period of time, for example 10 seconds (Counter$_{ELW}$>10,000 ms—yes), then the hot water supply system should be considered to be in order, the error memory state for hot water is deleted (Counter$_{FEW}$=0) and the hot water valve is reopened (Open valve 2. V2=1).

Figure 6:
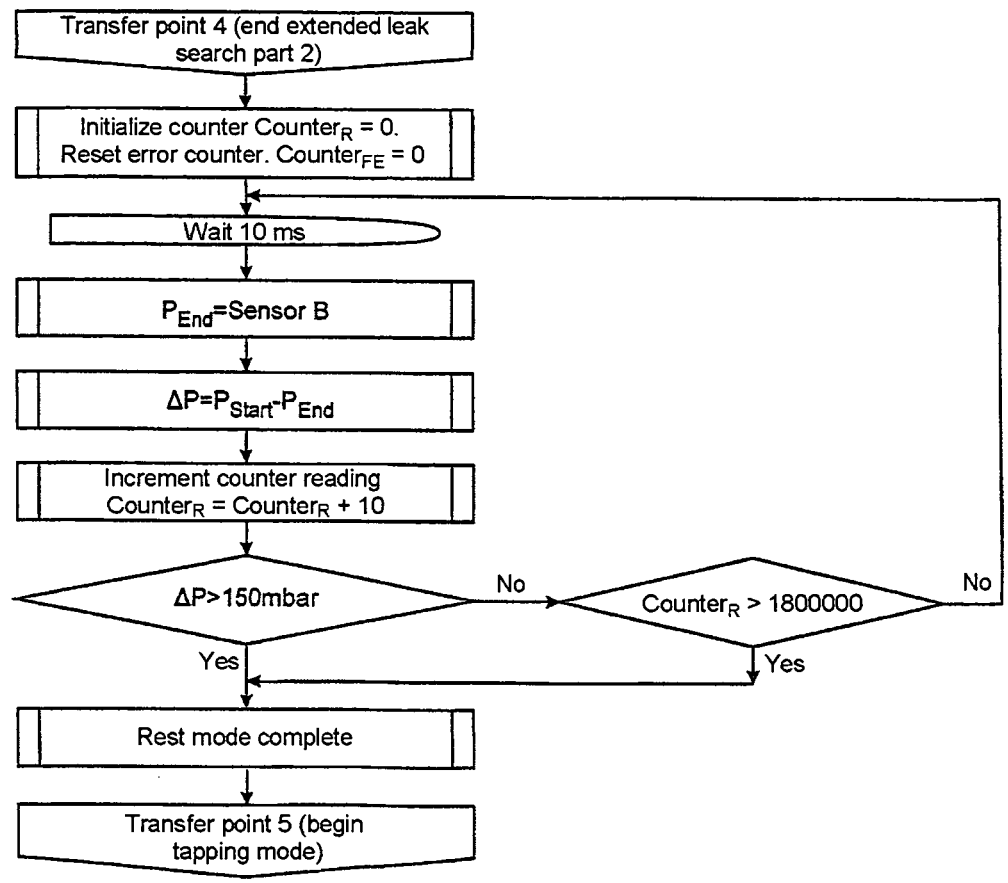
FIG. 6 shows a flowchart concerning a rest mode and
FIG. 7 shows a flowchart concerning an error evaluation mode.

If the pressure drop in the cold water part is not exceeded within a set period of time, for example 150 seconds (Counter$_{ELK}$>150,000 ms—yes), then the state that is in order is determined (−ΔP$_{Flag}$=1?—No), the error memory state is deleted and the system transitions into the rest mode (transfer point 4—FIG. 6).

The valve continues to remain closed in the rest mode (FIG. 6), and the pressure drop (ΔP=P$_{Start}$−P$_{End}$), calculated from the saved outlet pressure (P$_{End}$=Sensor B) and the currently measured outlet pressure, is compared to a fixed value, for example 150 mbar (ΔP>150 mbar).

For counting a specified period of time, it is necessary to initialize the counter (Counter$_R$=0) in a first step (Counter$_R$=Counter rest mode). The error counter is reset (Counter$_{FE}$ is set 0). Concerning the counter, the Counter$_R$ has to be incremented (Counter$_R$=Counter$_R$+10).

If this pressure drop is exceeded (ΔP>150 mbar—yes) or a period of time of approximately 30 minutes (Counter$_R$>1,800,000 ms) has run out, the system is transferred into the tapping mode (transfer point 5—FIG. 2).

Involved with the evaluation, there is thus permanent switching between the tapping mode, the various leak search modes and the rest mode during normal operation. However, this is not noticeable for the user, since the switching is very rapid and the pressure drops during the switching on and off are particularly small.

The updated state of the system to be monitored is always available in the error memories.

Should the leak search have been repeatedly completed with an error result and the summed up error value exceed a set value, a large fault can be assumed to be within the monitored system.

Should the extended leak search have been repeatedly completed with an error result and the summed up error value exceed a set value, a small leakage can be assumed to exist within the monitored system.

In the case of a fault, the solenoid valves for cold water, and possibly also for hot water, are permanently closed, or an alarm is output, depending on what was preset. The alarm message can be forwarded to a base by telephone, text message (SMS), or radio signal.

In the case of one embodiment of the invention, the valve-sensor unit is located either upstream or downstream in flow direction of a filter or a pressure control unit, depending on the construction of the piping network. If the system is installed upstream of the filter/controller, it is possible to detect mains-side pressure excesses and to protect the piping by shutting it off.

If the system is installed downstream of the filter/controller, it can monitor its functioning and likewise protect the piping by shutting it off.

By means of the installed counter for negative pressure differences in the extended leak search mode, part 2, the state of a check valve of a hot water processing system, for example, can be established.

The breakdown of the hot water processing system with regard to the desired heating of the water can be detected without temperature sensors in for example 10 seconds, by means of the permanently too low pressure drop during the tightness measurement in the case of the extended leak search, part 2, hot water since the cooling curve is much flatter in the case of lower fluid temperatures.

In a refinement according to the invention, it is possible to provide for a plurality of valve-sensor units in part lines of a pipe system, so that an occurrence of a fault can easily be limited spatially.

By means of additional temperature sensors, the accuracy in the case of large and/or rapid temperature variations of the fluid medium can furthermore be improved.

It is in principle possible to arrange the pressure sensor at various locations downstream of the valve. The pressure measurement of the fluid can also be determined indirectly, via pressure compensation vessels for example, or by other means present in the system. Of course it is possible to provide the system and its hardware and software with an integrated current supply which ensures that the memory is saved or operation continues in the case of a power failure.

The invention thus permits permanent monitoring of piping and piping systems with regard to leakages of different types. Alternatively, a temporary check is possible by installing a corresponding sensor system as a mobile machine and the connected piping system being analyzed over a predetermined period of time. With regard to the pressure measurements in the cold water line and/or hot water line, the function of valves present, check valves for example, can be checked by means of a specification of the system software.

There is additionally the possibility of determining heat losses of the piping system carrying the fluid media by means of evaluating measured pressure and temperature curves, in the case of a temperature sensor system being present. Finally, it is possible, according to the invention, to undertake time-controlled quantity limitation of the inflow of fluid media via particular piping or piping branches by using an apparatus required to implement the method. In addition to the control functions described above, it is within the scope of the invention to use the saved data and error states for the purpose of documenting conditions in the piping system, for example for controlling required heating-up functions of hot water processing systems for the purpose of reducing germs.

The invention claimed is:

1. A method for permanently monitoring pressurized piping and line systems, including connected loads, carrying fluid media, with pressure measurements in different modes being carried out downstream of a transfer point between supply device and load connection in order to establish consumption values over predeterminable periods of time and to infer the system state, characterized by the following steps:
arranging an electronically controllable shut-off valve downstream of the transfer point and a pressure sensor downstream of the shut-off valve in the direction of flow;
closing all removal points and building pressure in the system;
closing the shut-off valve and determining a first outlet pressure drop present over a first period of time by determining the difference between the outlet pressures measured at the start and end of the first period of time, and saving initial and final pressure values;
opening the shut-off valve and setting, and also saving, a fluid consumption value with the longest unchanging flow rate to complete a start-up procedure;
transitioning into a tapping mode by opening the shut-off valve for a second period of time;
switching to a leak search mode after the second period of time has elapsed by briefly shutting off the shut-off valve, determining an outlet pressure and saving this value, calculating a second outlet pressure drop by determining the difference between the outlet pressures measured at the start and end of the second period of time during the procedure to close the shut-off valve and comparing the second outlet pressure drop to a predetermined fixed value;

checking a value of the second outlet pressure drop in the preceding comparison step and determining a leak having a first magnitude or a first instantaneous consumption value and writing the result to an error buffer;

repeating the pressure drop measurement and comparing the value of the pressure drop obtained at this point in time to the value in the error buffer, and deleting the error buffer if no change can be determined;

transitioning into a first stage of an extended leak search mode with the shut-off valve still being closed by comparing the pressure drop in this step to a predetermined fixed value for determining a leak having a second magnitude that could be present, the leak having the first magnitude being greater than the leak having the second magnitude, writing an error value to a memory, repeating the pressure drop measurement and comparing the value of the pressure drop obtained at this point in time to the error value, and deleting the error value if no excess of the pressure drop value can be determined, or emitting an alarm if an excess value is determined with a subsequent transition into the tapping mode;

starting a second stage of the extended leak search mode after erasing the error value in the memory with the shut-off valve still being closed, establishing an instantaneous outlet pressure, saving this value, establishing a current pressure value and also determining the outlet pressure drop present over a third period of time by determining the difference between the outlet pressures measured at the start and end of the third period of time, this third period of time being longer than the first or second period of time, and comparison of the established outlet pressure drop present over the third period of time with the first outlet pressure drop, in order to infer the leak having the second magnitude in the case of excess;

saving and reporting the error value and also transition into the tapping mode or, in the case of the outlet pressure drop not being exceeded, transition into a rest mode with a closed shut-off valve, with the rest mode being terminated when a running pressure measurement reveals a pressure drop, or a period of time has elapsed, which is longer than the third period of time, with a subsequent transition into the tapping mode.

2. The method as claimed in claim 1,
characterized by
permanent switching between tapping and leak search modes, and rest mode.

3. The method as claimed in claim 2,
characterized in that,
in the case of multiple terminations of the leak search with an error message, the summed up error value is compared to a preset value and, in the case of it exceeding the preset value, a system fault with the leak having the first magnitude is inferred.

4. The method as claimed in claim 2,
characterized in that,
in the case of multiple terminations of the extended leak search with an error message, the summed up error value is compared to a further preset value and, in the case of it exceeding this further preset value, the leak having the second magnitude in the system is inferred.

5. The method as claimed in claim 2,
characterized in that
in the case of arranging the valve-sensor unit upstream in the flow direction of a filter unit or pressure control unit, the valve-sensor unit detects mains-side pressure excesses and, if applicable, the connected piping system is protected against these pressures by closing the valve.

6. The method as claimed in claim 2,
characterized in that
pressure variations due to temperature changes of the medium are taken into account via additional temperature sensors.

7. The method as claimed in claim 1,
characterized in that,
in the case of multiple terminations of the leak search with an error message, the summed up error value is compared to a preset value and, in the case of it exceeding the preset value, a system fault with the leak having the first magnitude is inferred.

8. The method as claimed in claim 7,
characterized in that,
in the case of multiple terminations of the extended leak search with an error message, the summed up error value is compared to a further preset value and, in the case of it exceeding this further preset value, the leak having the second magnitude in the system is inferred.

9. The method as claimed in claim 7,
characterized in that
in the case of arranging the valve-sensor unit upstream in the flow direction of a filter unit or pressure control unit, the valve-sensor unit detects mains-side pressure excesses and, if applicable, the connected piping system is protected against these pressures by closing the valve.

10. The method as claimed in claim 7,
characterized in that
pressure variations due to temperature changes of the medium are taken into account via additional temperature sensors.

11. The method as claimed in claim 1,
characterized in that,
in the case of multiple terminations of the extended leak search with an error message, the summed up error value is compared to a further preset value and, in the case of it exceeding this further preset value, the leak having the second magnitude in the system is inferred.

12. The method as claimed in claim 11,
characterized in that,
according to specifications, in the case of a fault the valve is permanently closed.

13. The method as claimed in claim 11,
characterized in that
in the case of arranging the valve-sensor unit upstream in the flow direction of a filter unit or pressure control unit, the valve-sensor unit detects mains-side pressure excesses and, if applicable, the connected piping system is protected against these pressures by closing the valve.

14. The method as claimed in claim 11,
characterized in that
pressure variations due to temperature changes of the medium are taken into account via additional temperature sensors.

15. The method as claimed in claim 7,
characterized in that,
according to specifications, in the case of a fault the valve is permanently closed.

16. The method as claimed in claim 15,
characterized in that
in the case of arranging the valve-sensor unit upstream in the flow direction of a filter unit or pressure control unit, the valve-sensor unit detects mains-side pressure excesses and, if applicable, the connected piping system is protected against these pressures by closing the valve.

17. The method as claimed in claim 1,
characterized in that
in the case of arranging the valve-sensor unit upstream in the flow direction of a filter unit or pressure control unit, the valve-sensor unit detects mains-side pressure excesses and, if applicable, the connected piping system is protected against these pressures by closing the valve.

18. The method as claimed in claim 1,
characterized in that
pressure variations due to temperature changes of the medium are taken into account via additional temperature sensors.

19. The method as claimed in claim 1,
characterized in that
the valve-sensor unit is additionally used in a hot-water line that is present.

20. The method as claimed in claim 19,
characterized in that
the valve in the hot-water line is closed at the beginning of the second stage of the extended leak search mode and the measurement and evaluation mode related to this is initiated.

* * * * *